United States Patent

[11] 3,596,680

| [72] | Inventor | Donald L. Adams<br>Rte. 2, Box 25-A, Tulia, Tex. 79088 |
| --- | --- | --- |
| [21] | Appl. No. | 801,450 |
| [22] | Filed | Feb. 24, 1969 |
| [45] | Patented | Aug. 3, 1971 |

[54] PLUG VALVE MANIFOLD
10 Claims, 6 Drawing Figs.

[52] U.S. Cl. ................................................... 137/637,
137/240, 137/608, 137/597, 137/625.42,
137/625.47, 251/181, 251/317
[51] Int. Cl. ....................................................... F16k 11/22
[50] Field of Search............................................ 137/597,
608, 637, 637.1, 637.05, 240

[56] References Cited
UNITED STATES PATENTS

| 1,441,088 | 1/1923 | Hofstetler..................... | 137/637.1 X |
| --- | --- | --- | --- |
| 2,891,732 | 6/1959 | Orter............................ | 137/610 X |
| 3,118,463 | 1/1964 | Lacart........................... | 137/597 X |
| 2,871,881 | 2/1959 | Hewson........................ | 137/597 |
| 3,066,909 | 12/1962 | Reed............................. | 251/309 |
| 3,180,350 | 4/1965 | Rill............................... | 137/240 |

Primary Examiner—Clarence R. Gordon
Attorney—Charles W. Coffee

ABSTRACT: A manifold connection is provided to connect the pressure taps from either side of an orifice to a pressure transmitter. By the use of two valves and two side ports, which are normally capped, it is possible to connect the pressure taps from the line to the transmitter or to interconnect the transmitter connections for zero calibration or to connect the transmitter to the side ports for connection of a calibrating pressure or to connect the pressure taps to the side ports to blow sediment from the lines. The handles are arranged not to interfere with each other except that the valves must be moved to a certain position in sequence or the handles will interfere with each other. The plugs of the valves are tapered at a smaller conical angle than the cavities in the valve body and the lining is feathered at each end for a good seal.

Patented Aug. 3, 1971

INVENTOR:
DONALD L. ADAMS

BY:

Patented Aug. 3, 1971

INVENTOR:
DONALD L. ADAMS

BY:
*C. W. Moffett*
Atty.

PLUG VALVE MANIFOLD

BACKGROUND OF THE INVENTION

1. Field of the Invention

This invention relates to measurements of differential pressures to determine flows and more particularly to a valve manifold for zeroing, calibrating, and blowing down a system, including a differential pressure transmitter.

2. Description of the Prior Art

In industry today, systems including differential pressure devices with differential pressure transmitters are used in great numbers. Probably the most common arrangement of such systems is to connect the two outlets of the differential pressure device to the transmitter with two pipes, with a valve in each pipe, and disconnect the piping on one side or the other of the valves to perform various tests, calibrations, etc. Workers in the field, e.g., Hewson, U.S. Pat. No. 2,871,881, have suggested providing a valve manifold connecting the pressure device to the transmitter so that the various functions of zeroing, calibrating, and blowing down, may be done more expediently. However, the prior art devices are characterized by bulkiness, and a great number of valves.

Also, plug valves are widely used type of valves and plug valves having a deformable lining between the plug and the body are known to the art. E.g., Reed, U.S. Pat. No. 3,066,909 shows it is known to place a tapered plug in a cylindrical bore; however, bringing the liner down to a feather edge to prevent leakage seems not to be appreciated in the prior art.

SUMMARY OF THE INVENTION

According to my invention for the solution of the problem, I have provided a simple, compact manifold having only two plug valves to provide the various connections. Specifically, each plug has three interconnecting ports and fits into a cavity in the valve body with four passageways opening into each valve cavity. By simple manipulation of the valves, the transmitter may be connected to the differential pressure taps or the two transmitter connections may be connected together, there is the same pressure on each side of the transmitter; therefore, the transmitter should read zero and it is possible to thereby adjust the transmitter to a zero setting in this condition.

If further calibration is desired, the transmitter connections can be connected to the side ports, which may be uncapped readily, and any number of differential pressures introduced into the side ports so that the reading of the transmitter may be calibrated through whatever range desired.

Also, sometimes, impurities or sediments form in the line and it desired to blow down the lines by opening the pressure taps to atmosphere at the manifold. With the side ports uncapped, this blow down is accomplished by moving the valves to yet a third position. To have any of the fluid being processed in the process line leak to the atmosphere would be undesirable. However, a slight seepage from one connection to the other is in no way detrimental because the fluids on either side of the valves in either of the lines are the same. A slight seepage of fluid will not change either the absolute pressure or the differential pressure between the lines, provided the seepage is small compared to the cross-sectional opening of the lines. Thus, a particular problem is presented, whereas a small seepage around the valve stems is unpermittable, a seepage from one passageway to the other may be tolerated.

An object of this invention is to provide a manifold valve to connect the pressure taps to a differential pressure transmitter.

Other objects are to achieve the above with a device that is sturdy, compact, durable, lightweight, simple, safe, versatile, efficient and reliable, yet inexpensive and easy to manufacture, install, operate, and maintain.

Further objects are to achieve the above with a method that is safe, rapid, versatile, lightweight, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENTS

Figure 1:
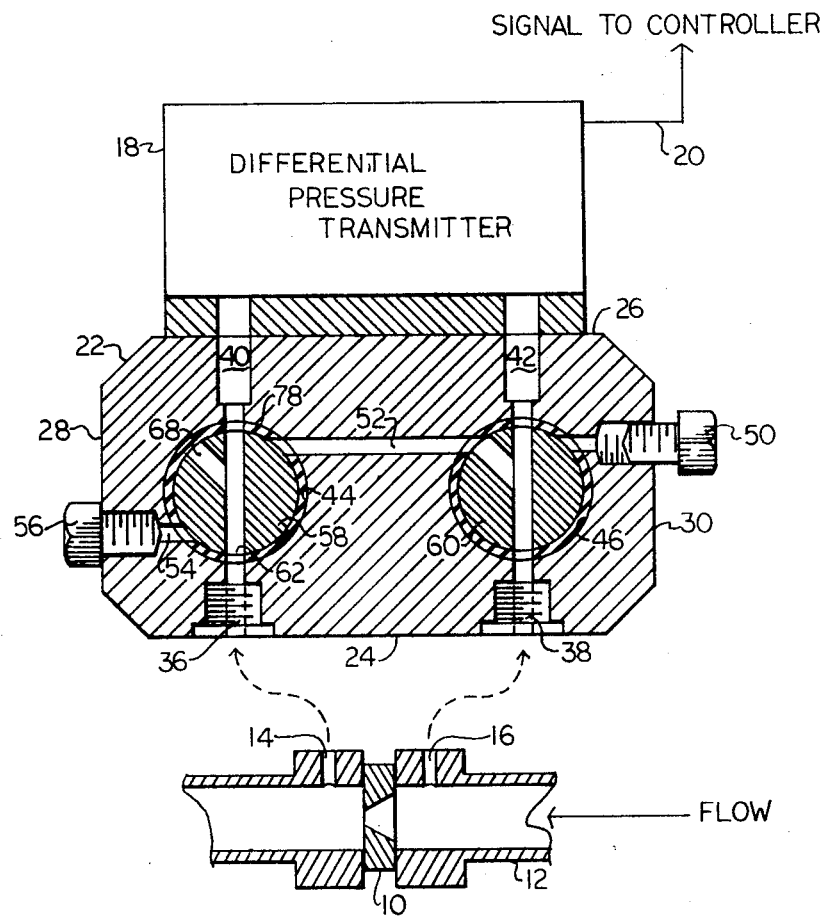
FIG. 1 is a sectional view, taken substantially on line 1-1 of FIG. 5, of a valve manifold according to this invention shown schematically in relationship to the system of which it would form a part.
Figure 2:
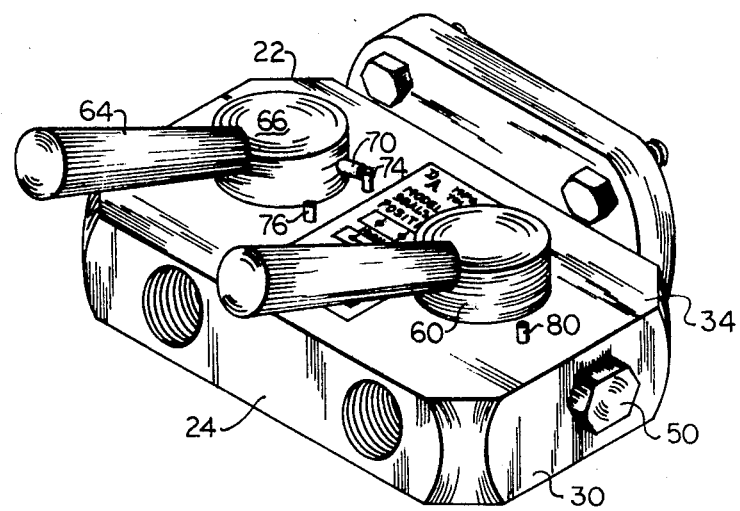
FIG. 2 is a perspective view of the valve manifold.

As seen in FIG. 1, the transmitter 18 is set up typically to transmit the pressure on either side of orifice 10 in line 12. The orifice is conventionally attached between two flanges and there are pressure taps 14 and 16 extending through the flanges. As explained above, the purpose of this transmitting manifold normally (in the normal position) is to transmit the pressure as determined at these two pressure 14 and 16 to transmitter 18. The transmitter conventionally is an instrument that determines the difference between the two pressures and translates this into an output signal in the form of air pressure which is shown in the drawing as being directed to some distant point in tube 20.

The body 22 of the valve manifold is a parallelopipedon having opposed line face 24 and instrument face 26. Also, it has an opposed low-pressure end 28 and high-pressure end 30. To complete the other two of the six sides, there is a bottom 32 and top 34. The pressure tap 14 is connected at the line face 24 to low-pressure-line passageway 36 and the pressure tap 16 is connected to high-pressure-line passageway 38, which is located in the line face 24. The passageways 36 and 38 on the line face 24 of the body 22 are both conveniently enlarged and threaded for the connection of the conduits thereto. Low-pressure-instrument passageway 40 at the instrument face is connected to the transmitter 18 while high-pressure-instrument passageway 42, also on the instrument face, is likewise connected to the transmitter 18. On conventional installation, the manifold body 22 will be mounted against the transmitter 18; therefore the invention has been illustrated with connections to bolt the manifold to the transmitter with the passageways forming fluid conduits to openings in the transmitter.

Low-pressure bore or cavity 44 extends from the top 34 of the body to the bottom 32 thereof. Also, high pressure cavity 46 extends from the top 34 to the bottom 32. The low-pressure-line passageway 36 and low-pressure-instrument passageway 40 open into the low-pressure cavity 44 at diametrically opposed points. These two passageways are aligned and conveniently formed by a single drilling operation. Likewise the high-pressure-line passageway 38 and high-pressure-instrument passageway 42 enter the high-pressure cavity 46 at diametrically opposed points and are aligned.

End-high-pressure passageway 48 extends from the high-pressure end 30 to the high-pressure cavity 46 and enters that cavity offset about 60° from the point that the high-pressure-instrument passageway 42 enters therein. The outer end of this passageway is enlarged and threaded to receive high-pressure capscrew 50. Bypass passageway 52 connects the low-pressure cavity 44 with the high-pressure cavity 46 entering each cavity about 60° offset from where the high-pressure-instrument passageway 42 enters high-pressure cavity 46 and also about 60° offset from where low-pressure-instrument passageway 40 enters low-pressure cavity 44. The bypass passageway 52 is aligned with the end-high-pressure passageway 48 and therefore, they too may be conveniently formed by single drill operation.

End-low-pressure passageway 54 enters the low-pressure cavity 44 offset about 60° from the low-pressure-line passageway 36. The passageway 54 is also enlarged at its outer end and threaded so that low-pressure capscrew 56 may be screwed therein. Low-pressure capscrew 56 is threaded into the low-pressure end 28 and the high-pressure capscrew 50 is threaded into the high-pressure end 30.

Low-pressure plug 58 and low-pressure cavity 44 and high-pressure plug 60 and high-pressure cavity 46 are identical in shape and construction. Therefore, only the low-pressure plug 58 will be described in detail as it will be understood that the high-pressure plug is identical in every structural detail.

The plug in the cavity form the plug valve as is conventionally known. The plug 58 is conic in shape, i.e., it is tapered with the small end down. There is a diametrical bore 62 through it. The bore is aligned with handle 64 which is attached to stem 66 which extends above the top 34. Angle bore 68 is drilled into the plug 58 at an angle of about 60° from the diametrical bore 62. Pointer 70 is attached into the stem 66 above the top 34 and cooperates with blowdown pin 72, normal pin 74 and zero-calibrate pin 76 set into the top 34. Rotation of the valve plug into different positions interconnects different passageways. Namely, low-pressure-line passageway 36, low-pressure-instrument passageway 40, bypass passageway 52, and end-low-pressure passageway 54, are connected in different combinations. Inasmuch as there are four passageway entering into the cavity 44 and three ports into the plug 58, it can be appreciated there is a possibility of excessive seepage from one passageway to another around the plug liner 78. I have found that for optimum results, it is desirable to make the angle between the diametrical bore 62 and the angle bore 68 to be exactly 62° when the passageway 54 is five-eighths the diameter of passageways 36 and 40. With this angle, I am able to obtain optimum results. Therefore, all of the passageway angles which have previously been given as about 60° are in the preferred embodiment made 62°. The pointer 70 upon the high-pressure plug 60 also cooperates with blowdown pin 80, normal pin 82 and calibrate pin 84.

Figure 3:
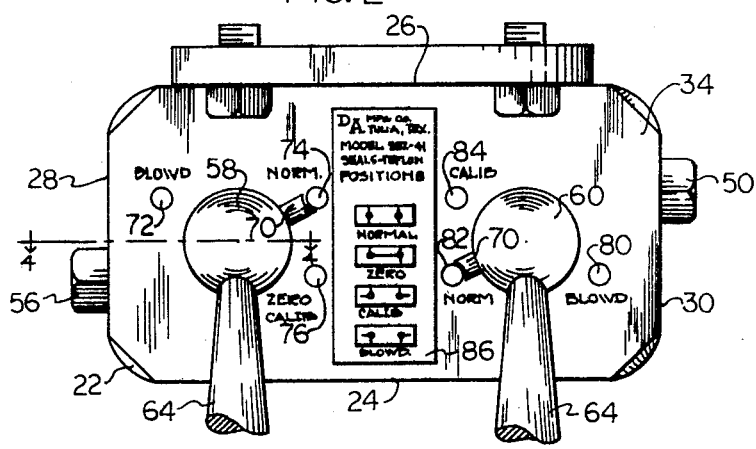
FIG. 3 is a top plan view of the valve manifold with the handles broken for convenience of illustration.

As may be seen by a close analysis of the above description and particular reference to FIGS. 1 and 3 of the drawings, the instrument may be connected into the four basic positions.

Position 1: Normal operating position; with both plugs in the normal position and both capscrews 50 and 56 in place, the pressure taps 14 and 16 will be connected to the transmitter 18 in the normal position.

Position 2: Zero position; the low-pressure plug 58 is moved to the zero position and the lines will be connected as seen in the chart 86 on the top 34 (FIG. 3).

Position 3: Calibrate position; both the plugs 58 and 60 are moved to the calibrate position and the capscrews 50 and 56 removed for the attachment of the calibrating pressures into the manifold. It will be noted that the handles 64 are longer than the distance between plugs and therefore, it is normal to move the low-pressure plug 58 to the calibrate position first. This is deemed advisable because it is considered that there is less possibility of damage being done to the transmitter 18 if this sequence is followed.

Position 4: Blowdown position; the capscrews 50 and 56 are removed and the plugs moved to the blowdown position. Again, because of the length of the handles, it is necessary to move the high-pressure plug 60 first to the blowdown position and then thereafter to move the low-pressure plug 58 to the blowdown position.

It will be understood by those skilled in the art that plug valves require great force to turn; therefore, it is necessary to have long handles 64 upon the stems 66 so that the plugs may be moved into desirable relationship, and to have the handles angle up so that each handle 64 will clear the stem 66 of the other plug. It is by this particular configuration of the handles that I was able to design a compact manifold that could be bolted directly onto the transmitter.

Generally, a small seepage from one passageway to the other is not detrimental. It is important that there be no leakage around the stem 66 extending through the top 34 or the bolt 88 extending through the bottom 32.

I have found that very good seals can be obtained by adjusting the pressure which is placed upon the material of liner 78. This liner is made of some convenient deformable material, e.g., Teflon suits the requirements of most industrial installations; however, other materials which are also commercially available on the market, such as those known by the trade names of Kel-F or Penton, may be used.

Figure 4:
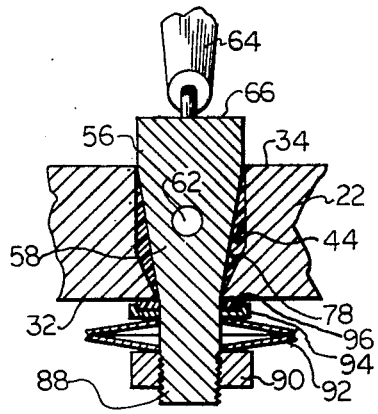
FIG. 4 is a sectional view taken substantially on line 4-4 of FIG. 3 showing the details of construction of one of the plug valves.
Figure 5:
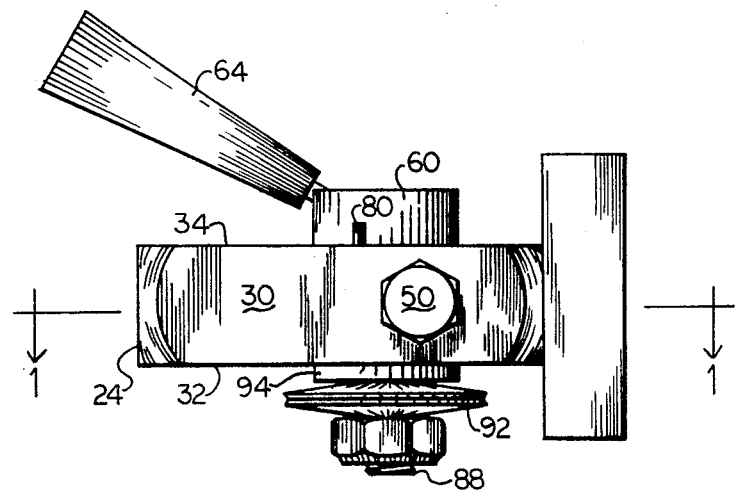
FIG. 5 is an end elevational view.

Specifically, the cross-sectional area of the liner 78 is greater in the middle than it is on the top 34 or the bottom 32. The cross-sectional area of the liner is wedge shaped and reduced to a feather edge at the top and bottom. Stated otherwise, at the top of the cavity 44, the clearance between the cavity and the plug 58 is 0.001 inch ± 0.00025 inch. Therefore, when axial pressure is exerted upon the plug by self-locking nut 90 upon the end of threaded end of bolt 88, the pressure is exerted upon the deformable liner 78 and the liner tends to be wedged into extremely small clearances at top and bottom, placing extreme pressure at these points to prevent leakage. In the conventional plug liner, the liner is relatively unrestrained at the top and bottom; therefore, the axial pressure results in a high pressure at the center of the liner where the ports would pass through the plug, but relatively low pressure at the ends. However, by my unique shape, the liner is restrained at the ends and the wedging action places extreme pressure upon the liner at the top and bottom (which are the ends of the plug) and not so much pressure at the center of the liner. The nut acts through Bellville spring washers 92 and thrust washer 94. The thrust washers have a Teflon ring 96 to reduce the friction. It may be seen specifically that the cavity in FIG. 4 is cylindrical for the upper two-thirds portion thereof and the lower one-third portion has a taper so that at the bottom, the diameter of the cavity is only 0.001 inch larger than the diameter of the plug, the plug having a uniform taper throughout its operating range.

Figure 6:
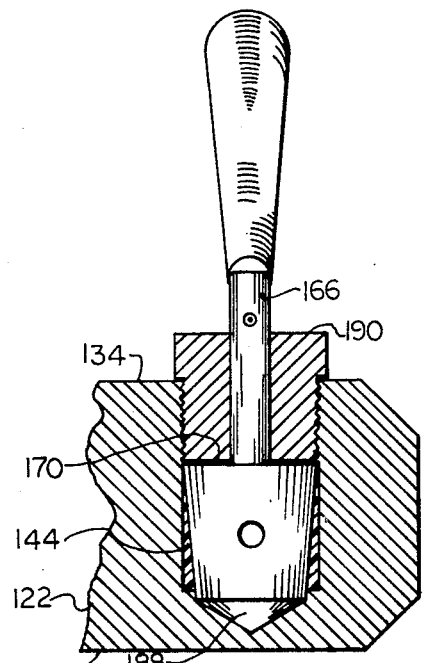
FIG. 6 is a sectional view similar to FIG. 4 showing a second embodiment of valve construction.

FIG. 6 illustrates a second embodiment of the plug valve. In the embodiment shown in FIG. 6, cavity 144 does not extend from top 134 of the body 122 to bottom 132, but the cavity 144 opens only from the top. Basically in this embodiment the cavity 144 is cylindrical for its entire length having a bottom pit 188 so that the bottom of the plug is not blocked. The plug itself is tapered throughout its working range, but there is a shoulder 170 formed between the tapered portion and the stem 166 of the plug. The plug is held in place and axial pressure exerted on the plug by jam nut 190 which is threaded into the upper portion of the cavity 144. Thus it may be seen that a tapered feather edge of the liner is achieved at the top of the liner; although the bottom has a small clearance, it does not have the tapered feather edge. On the other hand, any liquid fluid seeping from the bottom only goes into the pit 188 and can not escape therefrom.

The embodiments shown and described above are only exemplary. I do not claim to have invented all the parts, elements, or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. An improved valve manifold adapted to be placed between
  a. two fluid pressure taps, the pressure differential between which is to be determined, and
  b. a transmitter which determines said pressure differential;
  c. comprising:
  d. a parallelopipedon body having i. opposed high-pressure end and low-pressure end,
ii. opposed line face and instrument face, and
iii. opposed top and bottom,
e. a low-pressure plug having
   i. a handle extending from above the top of the body, and
   ii. seated in a low-pressure cavity in the body,
f. a high-pressure plug having
   i. a handle extending from above the top of the body, and
   ii. seated in a high-pressure cavity in the body,
g. said body having the following passageways,
   i. a low-pressure-line passageway from said low-pressure cavity to said line face adapted to be connected to one of said fluid pressure taps,
   ii. a low-pressure-instrument passageway from said low-pressure cavity to said instrument face adapted to be connected to said transmitter,
   iii. a high-pressure-line passageway from said high-pressure cavity to said line face adapted to be connected to the other of said fluid pressure taps,
   iv. a high-pressure-instrument passageway from said high-pressure cavity to said instrument face adapted to be connected to said transmitter,
   v. a bypass passageway between said low-pressure cavity and said high-pressure cavity
   vi. an end-low-pressure passageway from one end to said low-pressure cavity, and
   vii. an end-high-pressure passageway from the other end of said high-pressure cavity; and
h. each plug having three interconnecting ports therein.

2. The invention as defined in claim 1 with the additional limitations of
j. each of said body cavities shaped differently than said plug, specifically
   i. there is small clearance or feather edge between the plug and the body at the top and bottom of the body,
   ii. larger clearance between the plug and body between the top and bottom, resulting in
   iii. the cross-sectional space between the plug and the body tapering inwardly at each end, and
k. a deformable liner of correlative wedge shape to the cross-sectional space between the plug and body.

3. The invention as defined in claim 2 with the additional limitations of
m. said small clearance between the top and bottom of the body cavity and the plug being about 0.001 inch.

4. The invention as defined in claim 1 with the additional limitations of
j. said handles longer than the distance between plugs and at an angle thereto so that each handle may pass over the other plug.

5. The invention as defined in claim 1 with the additional limitations of
j. two of said ports in each plug being diametrically opposed and the third offset by about 60° from one of the others.

6. The invention as defined in claim 5 with the additional limitations of
k. each of said body cavities shaped differently than said plug, specifically
   i. there is a small clearance or feather edge between the plug and the body at the top and bottom of the body,
   ii. larger clearance between the plug and body between the top and bottom, resulting in
   iii. the cross-sectional space between the plug and the body tapering inwardly at each end, and
m. a deformable liner of correlative shape to the cross-sectional space between the plug and body.

7. The invention as defined in claim 5 with the additional limitations of
k. said handles longer than the distance between plugs and at an angle thereto so that each handle may pass over the other plug.

8. The invention as defined in claim 5 with the additional limitations of
k. said low-pressure-line passageway and said low-pressure-instrument passageway entering the low-pressure cavity diametrically opposed, and
m. said high-pressure-line passageway and said high-pressure-instrument passageway entering the high-pressure cavity diametrically opposed.

9. The invention as defined in claim 8 with the additional limitations of
n. said end-high-pressure passageway entering the high-pressure cavity offset about 60° from said high-pressure-instrument passageway;
o. said bypass passageway entering the high-pressure cavity offset about 60° from said high-pressure-instrument passageway and
p. aligned with said end high-pressure passageway;
q. said bypass passageway entering the low-pressure cavity offset about 60° from said low-pressure-line passageway.

10. The invention as defined in claim 9 with the additional limitations of
s. each of the angles defined above as "about 60°" is 62°.